United States Patent Office 3,232,789
Patented Feb. 1, 1966

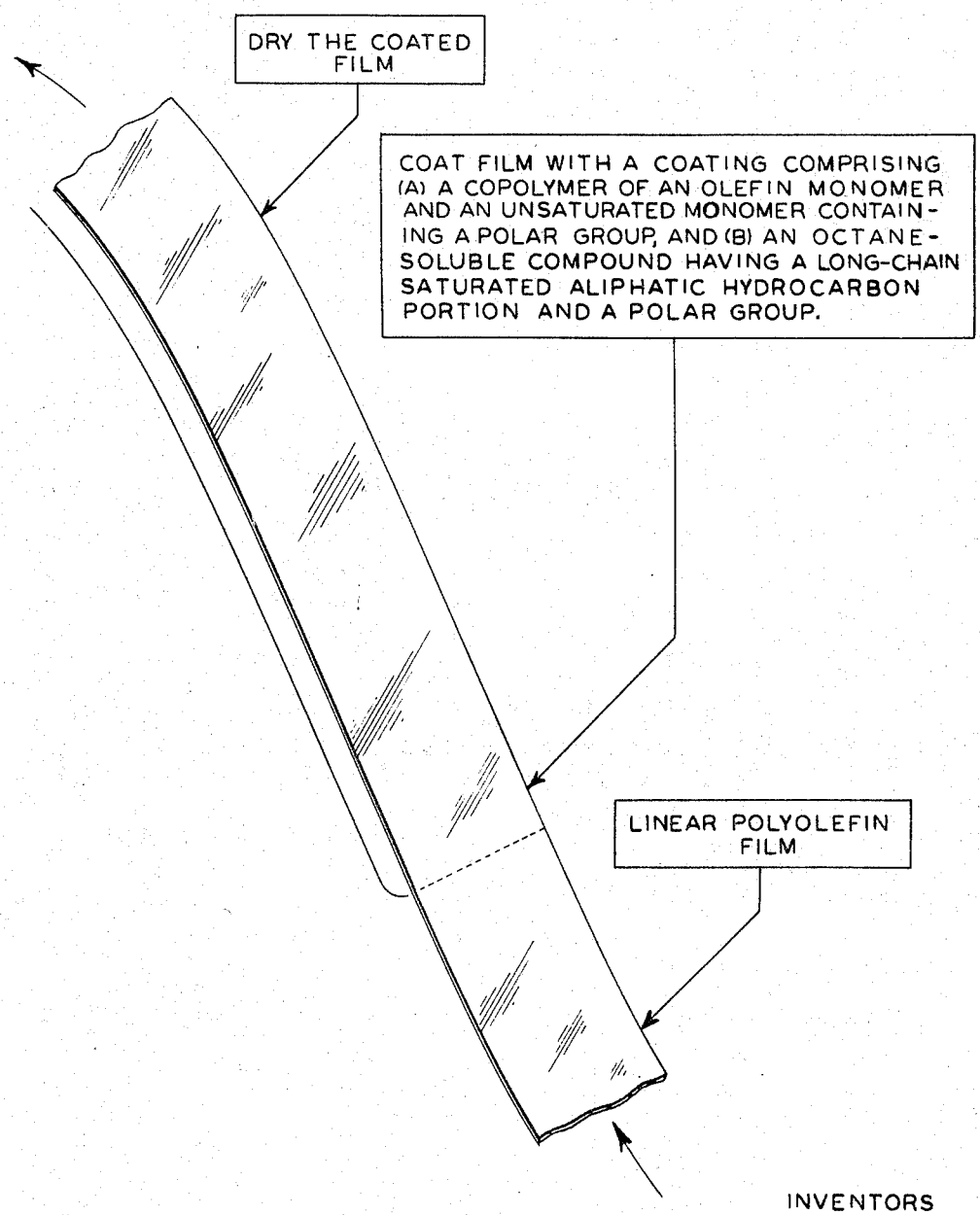

3,232,789
PACKAGING MATERIALS COMPRISING COATED LINEAR POLYOLEFIN FILMS OF IMPROVED HEAT-SEAL CHARACTERISTICS
Victor J. Pelzek and Eugene V. Goldstein, Milwaukee, and Adolph Miller, Fox Point, Wis., assignors to Milprint, Inc., Milwaukee, Wis., a corporation of Delaware
Filed Nov. 7, 1961, Ser. No. 150,660
24 Claims. (Cl. 117—138.8)

This application is a continuation-in-part of our copending application Serial No. 77,530, filed December 22, 1960, now abandoned.

This invention relates to heat-sealable packaging materials comprising films of linear polyolefin resins of relatively high softening temperatures; more particularly, to the improvement of the heat-sealing properties of films of linear polyolefin resins that have a relatively high softening temperature by providing thereon a coating which will permit heat-sealing of the resinous films throughout a broad range of temperatures substantially below the softening temperature of the uncoated film, and to coating compositions formulated to provide such improved heat-sealing temperature characteristics.

The synthesis of olefin polymers which exhibit a high degree of molecular order or regularity has been a significant recent development in the field of polymer chemistry. There are a variety of catalysts which are capable of controlling the propagation of olefin monomers into polymeric molecules possessing a high degree of geometrical regularity, herein termed linear polyolefins, characterized by a reduced degree of unintended branching of the polymer chain. Linear polyethylene, sometimes referred to as medium or high density polyethylene, and polypropylene which exhibits a substantial degree of stereoregular methyl group configuration are the chief examples of such linear polyolefins which have achieved commercial importance at the present time. Although films produced from such linear polyolefin resins have mechanical and chemical properties which would normally make them very useful in the packaging industry, their acceptance has been limited by the packaging industry because of their inability to form acceptable heat-seals on high speed commercial packaging and wrapping machinery. As an example, films of linear polyolefin resins are substantially less hygroscopic and therefore more dimensionally stable than cellophane materials which tend to shrink and wrinkle when subjected to varying humidity conditions and thereby produce unattractive packages or cause damage to the packaged articles. In comparison to films of branched-chain polyethylene, films of linear polyolefins exhibit unidirectional tearing which permits such films to be used with tear strips and the like for ready opening of packages formed thereof; closed packages of branched chain polyethylene films, on the other hand, are not so readily opened and often require the use of a knife or scissors. These and other advantages of linear polyolefin films could be utilized in the packaging industry if such films were more readily heat-sealable by high-speed packaging operations.

The poor heat-seal characteristics of linear polyolefin films are due to the high softening temperatures and narrow range of softening temperatures of such films which result from their highly linear molecular configuration. The viscosity-temperature characteristics of linear polyolefin materials are such that the reduced viscosity required to obtain the flow necessary to produce good heat-seal bonds is not reached until the materials are heated to temperatures closely approximating their softening temperatures, at which point mechanical loading, either with or without a slight increase in temperature, may be sufficient to cause a breakdown or burnthrough of the material which is to be heat-sealed. As a consequence, it is not possible to rely upon the thermoplastic properties of linear polyolefin materials per se for heat-sealing, unlike conventional branched-chain polyethylene, because it is difficult and expensive to control and maintain heat-sealing equipment within the narrow range of high temperatures required to heat-seal such materials without distortion and breakdown. Nor is it possible to utilize known heat-seal coating compositions which are suitable for other plastic film materials or cellophane due to their limited or poor adhesion to linear polyolefins and the excessively high heat-seal temperatures generally exhibited by such known compositions. In any case, these known compositions have generally been applied in relatively thick layers upon the film and contained large amounts of materials, such as solvents and other fugitive compositions. Solvent removal from thick coating layers is obviously difficult and, in addition, thick coatings are economically undesirable. Thus, the linear polyolefin films have not been able to replace cellophane, conventional branched-chain polyethylenes and readily heat-sealable thermoplastic films to any great extent in the packaging industry.

The present invention contemplates the provision of enhanced heat-seal characteristics of linear polyolefins of a high softening temperature which, for the first time, permits heat-sealing of such films on high-speed commercial packaging equipment without requiring extensive machine modification. It is expected that the more readily heat-sealable linear polyolefin packaging materials of this invention will increase the use of linear polyolefins in the packaging field and will, in many applications, permit the substitution of linear polyolefin packaging materials for cellophane, conventional branched-chain polyethylene, and the like.

A primary object of this invention is to adapt films of linear polyolefin resins for heat-sealing throughout a broad range of temperatures substantially below the softening temperature of the resin to thereby increase the utility of such films as packaging materials.

Another object of this invention is to provide a packaging material of enhanced heat-sealing properties comprising a linear polyolefinic film including thereon an adherent heat-seal coating composition wherein the coated film is characterized in its ability to form heat-seal bonds at sealing temperatures substantially below the softening temperature thereof.

Another object of this invention is to provide packaging materials comprising films of linear polyolefin resins which have enhanced heat-seal characteristics that render the materials heat-sealable on commercial packaging machinery without significant machine modification.

Another object of this invention is to provide heat-seal coating compositions that adhere well to linear polyolefin resinous films.

Another object of this invention is to provide packaging materials comprising films of linear polyolefin resins that are coated on one side with a thin, adherent layer to thereby render such films heat-sealable at temperatures substantially below the softening temperature of the resins.

These and other objects will appear in the following description wherein several specific embodiments of this invention are described in detail. It is understood that those skilled in the art may alter the embodiments described or utilize other embodiments and yet remain within the true scope of this invention. Consequently, the following description is to be taken in an illustrative rather than a limiting sense.

The drawing is a flow sheet illustrating one form of the process of this invention.

The term heat-sealing refers to the bonding of adjacent portions of thermoplastic material through the application of heat and pressure. Commercially, the most common method of heat-sealing is the so-called heated-bar sealing wherein two lapped pieces of thermoplastic film may be held between a pair of oppositely disposed sealing bars. At least one of the sealing bars may be heated by means of a resistance element maintained at a substantially constant elevated temperature throughout the heat-sealing cycle or by means of an impulse-type heater which is heated for a short duration during the total cycle. Apparatus embodying endless bands or rotary drums may be utilized to provide continuous heat-sealing. Other forms of heat-sealing equipment may utilize dielectric heating generated by high-frequency current to produce the required bonding or a jet of hot air or inert gas. The terms heat-seal or heat-sealing as used herein are thus broadly defined to refer generally to the bonding of thermoplastic materials by the application of heat and pressure and are not limited to any particular method or apparatus of heat-seal bonding.

The new group of linear polyolefin resins to which this invention particularly relates has become commercially available only within the past five years and comprises linear polyolefin resins whose molecular structure can be controlled and changed through selection of the polymerization catalyst and reaction conditions. These polymers are based primarily upon ethylene and propylene as starting materials and may be described as "ordered" polymers. Because of their ordered molecular configuration, polymeric masses of linear polyolefin resins exhibit a number of different kinds of regularity not shown by masses of non-linear polyolefin resins, chiefly: a higher percentage of crystalline area, a reduced percentage of unintended molecular branching and a greater degree of regular arrangement of side chains.

As to crystallinity, while it is true that polymeric masses of most polyolefins are partially crystalline in that they contain crystalline regions surrounded by amorphous regions, the linear polyolefin resins lead to masses which exhibit a higher degree of crystallinity than those obtained from non-linear polyolefins produced from the corresponding monomer. As an example, a conventional branched-chain polyethylene may yield materials which may be from 40–65% crystalline, whereas a linear polyethylene may yield materials which may be as high as 85–90% crystalline. The existence of crystallinity and its quantitative extent may be determined by several analytical methods, including X-ray diffraction, infrared spectroscopy, and differential thermal analysis.

In the case of chain branching, it is now well known that molecules of branched-chain polyethylene possess a high degree of chain branching of two types: long chain wherein the branches are, on the average, as long as the main polymer chain and short chain wherein the branches may be approximately 1 to 5 carbons in length, their exact length not as yet known. In comparison, molecules of linear polyethylene exhibit a great deal less chain branching and, particularly, short chain branching. Thus a typical branched-chain polyethylene may have as many as 2 to 4 methyl groups per 100 carbon atoms, whereas a typical linear polyethylene may show as little as 0 to 1 methyl groups per 100 carbon atoms, the number of methyl groups being an indicia of chain branching. (See for example, Bryant and Voter, Journal of the American Chemical Society, vol. 75, p. 6113 (1953)). The polyethylenes must of course be considered separately in this respect from high polyolefins such as polymers of propylene, butene-2, etc. wherein the monomeric units themselves introduce side chains to the polymer structure.

Polyolefins produced from monomeric units which introduce side chains, such as propylene, butene-2, etc., exhibit another type of architectural regularity which is generally referred to as stereoregularity. In this form of regularity, the branches introduced by the monomers may be disposed along either one side of the polymer chain (isotactic arrangement) or in alternating arrangement along both sides of the chain (syndiotactic arrangement), both of which are distinguishable from the random distribution of the branches along the polymer chain (atactic arrangement). Polymers produced from the higher olefins will generally comprise mixtures of the stereoregular molecules and the atactic molecules.

We have therefore applied the term "linear" to characterize these newer types of polyolefin resins which exhibit an ordered arrangement of the monomeric groups which make up the polymer chain. The term linear thus implies the tendency of such polymers to more readily align themselves to form crystalline regions, to exhibit a lowered degree of unintended chain branching in the case of polyethylene, and to exhibit a more regular side chain arrangement in the case of higher olefins having more than two carbon atoms. In order to provide a criterion by which the linear polyolefins may be distinguished from the non-linear polyolefins, we herein adopt the standard Vicat softening temperature determined in accordance with ASTM D1525–58T. The Vicat criterion is preferable to either chain-branching or degree of crystallinity criteria since it may be applied to a wide variety of linear polyolefin resins. Thus, although a specified percentage of crystallinity may distinguish linear polyethylene from branched-chain polyethylene materials it would not apply to polypropylenes. Also, although chain branching determined by methyl group analysis may be used to distinguish linear polyethylene from branched-chain polyethylene, it would not be useful to characterize polyolefins made from higher olefins which themselves introduce methyl groups into the polymer, such as propylene. The Vicat softening temperature, in comparison, has been found to be an adaptable distinguishing criterion and is therefore used herein to characterize linear polyolefins whether they be polyethylene, polypropylene, or others. For purposes of the present invention, polyolefin resins which have a Vicat resin softening temperature equal to 235° F. or more have been found to exhibit the linear characteristics discussed herein and have been successfully heat-sealed in accordance with the teachings of the present invention.

The molecular linearity of the linear polyolefins to which this invention relates manifests itself in certain of the physical characteristics of materials made from such polymers, the following being the most important from the standpoint of utilizing such materials:

(1) The density increases with increasing linearity. Whereas the density of branched-chain polyethylene may range from about 0.913 to below about 0.925, the density of linear polyethylenes may range from about 0.925 up to as high as about 0.96. This is not an unexpected result, since linear molecules with a minimum of branching would tend to pack more closely together than non-linear molecules.

(2) The proportion of crystalline area increases with increasing linearity. A "low-density" polyethylene may be 40–65% crystalline, while a linear polyethylene may run as high as 85–90% crystalline.

(3) The melting point or softening point increases with increasing linearity. Using the Vicat softening method (ASTM D1525–58T), a typical branched-chan polyethylene would show a softening point in the range of 176–215° F. Using the same method, a linear polyethylene having a density of 0.96 may have a Vicat softening point of 260° F. Thus, when the softening point temperatures of linear resins are compared with their respective densities it has been observed that there is a rapid increase of softening point temperatures as the density (linearity) increases. A typical high density resin exhibits almost complete linearity at a density of about 0.96.

(4) With increasing linearity and the consequent increasing crystallinity, a linear polyolefin resin exhibits a narrow softening range. This, again, is an expected result, since the substance behaves more like a crystalline material and less like an amorphous one. The method of Differential Thermal Analysis (cf. Journal of Polymer Science, vol. 42, pp. 15–23) shows the narrowing of the melting range and the increasing crystallinity with increasing linearity. A typical branched-chain polyethylene shows a melting range of as much as 30° C., a latent heat of fusion of 33.6 calories per gram and a crystallinity of 52%, while a typical linear polyethylene ("Marlex 50," sold by the Phillips Petroleum Company) shows a melting range of only 15° C., a latent heat of fusion of 58.6 calories per gram and a crystallinity of 91%.

(5) It has been further observed that the stiffness of polyolefins increases sharply with increasing molecular linearity.

To summarize, the linear polyolefins in general exhibit the following properties: (a) higher softening points than the corresponding non-linear polyolefins; (b) narrower softening ranges than the corresponding non-linear resins; and (c) greater film stiffness than the corresponding non-linear resins. High stiffness in a packaging film is a desirable property since it renders the film easier to guide in packaging machinery and makes it possible to push the film into proper position for wrapping rather than pulling it. A high softening point is also desirable, since it renders the film stable under severe ambient conditions. However, the very narrow softening range characteristics of linear polyolefins is undesirable since it requires the use of complex and precisely adjusted temperature controlling devices on conventional packaging machinery and the use of special parts and special mechanisms to prevent "burn-through" of the film. On machines used presently for cellophane the handling of such film presents difficulties of major consequences. In practice, the temperature of the heat-sealing members of the machine must be well above the beginning of the softening range of the film in order to soften the film enough to form a heat-seal. Even a slight increase in temperature, particularly when accompanied with mechanical stress, will cause the film to become sticky and tend to cling to the sealing members of the machine and interfere with the heat-sealing operation. It is apparent that considerable modification and rebuilding of such machines and temperature controls therefor would be required in order to run linear polyolefins. This type of modification is generally impractical and, therefore, the undesirable heat-sealing properties of films of linear polyolefins have inhibited their use as packaging materials even though they possess other properties which make them attractive as packaging materials.

According to this invention, however, linear polyolefin films can be heat-sealed throughout a broad range of temperatures substantially below their softening point, particularly within the range of about 170° F. up to about 5° F. below the film softening temperature. Heat-sealibility at these low temperatures permits linear polyolefin films to be heat-sealed on conventional packaging machinery of the type adapted to heat-seal cellophane and other easily heat-sealable materials. Heat-sealability within this broad range of temperature means that the sealing temperature of the machines will not have to be precisely maintained within a narrow temperature range and that, hence, the packaging machines will not have to be extensively modified to include precise or complicated temperature controls. As far as is known, linear polyolefin films have never been heat-sealable at these low temperatures and throughout this broad temperature range prior to this invention. This invention thus provides packaging materials comprising a film of linear polyolefin resin and a thin, adherent layer of a heat-sealable composition which includes two essential ingredients, a film-forming ingredient and a primary anti-block agent.

The film-forming ingredient of the heat-seal compositions of this invention is a film-forming polymeric thermoplastic resin comprising a copolymer of an olefin monomer and an unsaturated monomer containing a polar group, particularly ethylenically unsaturated organic esters including lower alkyl esters of acrylic and methacrylic acids and allyl and vinyl esters of mono-basic organic acids. The molar ratio of the olefin monomer units to the monomer units containing a polar group in the copolymer is desirably from about 3:1 to 4:1. The olefin and the ethylenically unsaturated portion of the polar monomer copolymerize to form a hydrocarbon backbone, thus positioning the polar groups in side-chain relation to the main hydrocarbon backbone of the polymeric resin. Examples of the olefin monomer are ethylene, propylene, butane-2, alone, or in admixture with one another, and examples of the monomer containing a polar group are vinyl and allyl acetates, ethyl acrylate and methyl methacrylate. Ethylene is the preferred olefin monomer and vinyl acetate, ethyl acrylate and methyl methacrylate are the preferred monomers containing a polar group.

We have found that film-forming polymeric resins of this type exhibit enough adhesion to linear polyolefin films to be useful in the production of heat-seal coatings therefor and it is theorized that this is because they are similar to and thus compatible with linear polyolefin resins because of the presence of a sufficiently long-chain hydrocarbon group. Those polymeric resins which are not of this type are not compatible with linear polyolefin resins and do not adhere well to a linear polyolefinic surface even though they might be film-forming. Examples of such unsatisfactory resins are polyvinyl chloride; polyvinyl acetate; polyvinylidene chloride; vinyl chloride copolymers; nitrocellulose; ethyl cellulose; ethyl, methyl and butyl methacrylate homopolymers; and polyesters. The compatibility with the linear polyolefin film base of the polymeric film-forming resins of the type described is believed to be due to the presence of the saturated aliphatic hydrocarbon main chain. The polar groups in these film-forming resins appear to enhance solubility in the solvents useful in the solution coating art.

The film-forming polymeric resins of the type described above do not alone produce satisfactory heat-seal coatings for packaging materials since the resulting coatings are quite sticky and tend to block. That is, if the coated material were wound up on a roll or stacked in sheets the coating would adhere to adjacent coated or uncoated surfaces. This condition must be avoided for most packaging applications. However, we observed that compounds conventionally used to impart anti-block properties greatly impair the cohesiveness of a film-forming polymeric resin of the above type or its adhesion to a linear polyolefin film substrate. There was impairment to such an extent as to destroy the utility of the film-forming resin in a heat-seal coating. We have now found that certain materials with specific properties can be admixed with the film-forming polymeric resins of the type described above to provide anti-blocking properties and, at the same time, either preserve or enhance both the cohesiveness of the film-former and its adhesion to the polyolefin film substrate. This class of compounds will be referred to herein as "primary anti-block agents" and the properties which they must exhibit are they must have adhesion to the polyolefin substrate by themselves, they must confer anti-blocking characteristics on the film-former, and they must be sufficiently soluble in a mutual solvent for the film-formers to enable them to be present in the coating at a high enough solids content to be useful. The agents which have been discovered that exhibit these properties have a molecular structure which includes a long-chain saturated aliphatic portion and a polar group. The presence of a saturated aliphatic portion and a polar group provides sufficient structural similarity to the film-formers so that essentially co-valent bonds with the film-formers may be formed, thus avoiding undue degradation. Further, the long-chain saturated aliphatic hydrocarbon portion of these materials contributes to adhesion to the polyolefinic film substrate and the film-former and the polar group enhances solubility. The relation between the number of polar groups and the length and number of hydrocarbon chains should be such as to render the material compatible with the polymeric film-forming resin with which it is to be employed. Compounds of this general type which exhibit solubility in n-octane at a concentration of at least 1.0 grams per 100 ml. of solution at room temperature have been found useful as primary anti-block agents for the heat-seal coatings of this invention, while compounds with a solubility below this concentration have been ineffective. Thus, the phrase "octane-soluble" as used in the appended claims is defined to mean room temperature solubility in n-octane at a concentration of 1.0 gram per 100 ml. solution or higher. The compounds which have proved useful as primary anti-block agents include esters of monohydric and polyhydric alcohols (i.e., alcohols with two or more hydroxyl groups) and a long-chain saturated aliphatic acid with at least 12 carbon atoms and ketones with at least one long-chain hydrocarbon radical of at least 12 carbon atoms. Compounds having at least two long-chain saturated aliphatic hydrocarbon radicals of more than eleven carbon atoms and at least one carbonyl group per molecule have proved especially useful. Esters of tetrahydric and trihydric alcohols have proved particularly effective, probably because each molecule of such compounds provides a plurality of polar groups and long-chain aliphatic hydrocarbon groups. Examples of primary anti-block agents include: pentaerythritol tetrastearate; synthetic and natural bayberry wax, which are primarily mixtures of trimyristin, tristearin and tripalmatin; stearone; and beeswax, which has a substantial portion of myricyl palmitate, myricyl cerotate and lacceryl palmitate.

In addition to the foregoing two essential ingredients, the heat-seal coatings of this invention may include other ingredients to enhance certain coating properties for particular uses. For example, the heat-seal strength data listed hereinbelow indicate that heat-seal coatings consisting of the two essential ingredients (i.e., a film-former and a primary anti-block agent of the types described above) form heat-seal bonds of excellent strength when a coated surface is heat-sealed to a coated surface and in most instances when a coated surface is heat-sealed to an uncoated surface. However, for some commercial applications it is generally desired to have a heat-seal bond which will exhibit a strength of about 75 to 100 grams/inch of heat-seal, measured as described below and it is desirable that coated materials be able to form such heat-seal bonds at low sealing temperatures of below about 200° F. Thus, particularly in those instances where it is desired to heat-seal a coated to an uncoated surface at these low temperatures and attain this level of heat-seal strength a low sealing temperature heat-seal strengthening resin may be admixed with the film-former and primary anti-block agent. Such resins are defined as resins with a melting point of 100° C. or less and which are compatible with the film-former. Suitable low sealing temperature heat-seal strengthening resins include resins of the following types which melt at 100° C. or less: rosin esters such as glycerol esters of rosin, glycerol esters of hydrogenated rosin, and glycerol esters of polymerized rosin; p-toluene sulfonamide-formaldehyde resins; phenol-formaldehyde resins, phenol modified coumarone-indene resins, alkylated phenolic resins and chlorinated biphenyl resins; and terpene type hydrocarbon resins. Thus, the addition of a low sealing temperature heat-seal strengthening resin may, in some instances, broaden the temperature range over which the coated materials of this invention may be effectively heat-sealed. This further serves to lessen the need for precise heat-sealing temperature control equipment. The particular resin used in any given packaging operation will to some extent depend upon the nature of the material being packaged, e.g., some of the foregoing resins may be more suitable than others for packaging foodstuffs.

Other optional ingredients include plasticizers, surface slip agents and secondary anti-block agents. The plasticizers preferably should be compatible with the coatings; epoxidized soybean oil has proved most effective. Small amounts of surface slip agents such as carnauba wax, bentonite clay, fatty acid amide type waxes such as Armid O and Armid HT which "bloom" to the surface of the coating may be included to improve the "machineability" of the coated film for applications where the coated material is required to pass over formers, guides and the like such as may be associated with modern automatic packaging machinery. Secondary anti-block agents which may enhance the blocking characteristics of the heat-seal coatings but which are unsatisfactory if employed in the absence of a primary anti-block agent may also be added. These secondary anti-block agents should be compatible with the other ingredients of the coating; suitable materials include paraffin wax, microcrystalline wax, petrolatum wax and chlorinated paraffin wax.

The heat-seal coating compositions of this invention are employed as solvent solutions. The solvents may be aromatic solvents, such as toluene, xylene and benzene. The particular solvent used may be influenced by the end use of the coated packaging material. Solvent solutions of the coating compositions of this invention dry by evaporation of the solvent and it is necessary that the coatings be substantially free of solvent after drying to prevent odor problems or problems of solvent contamination of articles packaged in the film. The problem of solvent release is particularly acute with the coatings of this invention because of the nature of the film-formers, the relatively large amount of solvent necessary to dissolve all the coating ingredients and the relatively impervious nature of the linear polyolefin substrate. Solvents release is greatly facilitated if the coating can be applied as a very thin layer and, hence, the heat-seal coatings of this invention must be able to form strong heat-seal bonds and provide a cohesive, adherent film coating with a minimum of solids content. It has been found that solids contents above about 1.5 pounds per 3,000 square feet of film surface will render solvent evaporation so difficult as to make it generally impractical with current coating techniques and devices available in the packaging industry. However, it has further been found that the heat-seal coatings of this invention can be applied to linear polyolefin film substrates at coating weights ranging from about 0.5 to 1.5 pounds of solids per 3,000 square feet of film and all of the coatings of the following examples were applied at this range of coating weight. Coating weights of about 0.7 to 0.8 pound of solids per 3,000 square feet of film surface are considered optimum. As the data below demonstrate, the heat-seal coatings of this invention provide a strong heat-seal bond at these very low coating weights. The effectiveness of these thin coatings is thought to result from the use of the described primary anti-block agents which combine a high degree of anti-block action without unduly impairing either the adhesion of the coating to the substrate or the film strength of the coating itself.

This invention will be more fully understood by reference to the following examples. It is pointed out, however, that the examples are given for the purpose of illustration and are not to be construed as limiting the scope of the present invention. In the following examples, heat-seal coating compositions were compounded according to this invention and their compositions listed in Tables I and II on a parts by weight 100% solids basis. Table I shows Examples 1 through 6 which comprise coating consisting of a film-forming polymeric resin and a primary anti-block agent of the types described above. Table II shows Examples 7 through 16 which comprise coatings including these two ingredients plus certain of the optional ingredients. The coating compositions of the examples were compounded as a toluene solution with toluene comprising about 60–90% by weight of the total solution. The coatings of the examples were mixed according to the following general procedure: The film-forming polymeric resin, the primary anti-block agent and about 20% of the total solvent were placed in a vessel and agitated with a suitable mixer, such as a "Cowles" disperser, for about 10 to 15 minutes until a paste was formed. The balance of the solvent was then introduced and the resulting mixture slowly agitated until a clear, low viscosity solution was formed. The secondary anti-block agents, the plasticizer and surface slip agents (in those coatings where these ingredients were used) were then added to the solution under agitation. After these materials were completely dissolved, the entire solution was agitated with a mixer suitable for low viscosity solutions such as "Lightnin" brand mixer made by Mixing Equipment Co., and the low sealing temperature heat-seal strengthening resin, where employed, was added and the entire solution agitated until all elements were dissolved. The film-formers used in the examples ranged from about 60–85% by weight olefin monomer with the balance comprising an unsaturated monomer containing a polar group. The epoxidized soybean oil used as plasticizer in some examples had an iodine number below 6.0 and an oxirane content greater than 6.0.

*Table I*

|  | Ex. 1 | Ex. 2 | Ex. 3 | Ex. 4 | Ex. 5 | Ex. 6 |
|---|---|---|---|---|---|---|
| Film-forming polymeric resin: |  |  |  |  |  |  |
| Ethylene-vinyl acetate copolymer | 82.5 | 69.5 |  |  | 69.5 |  |
| Ethylene-ethyl acrylate copolymer |  |  | 79.5 | 65.5 |  | 65.5 |
| Primary anti-block agent: |  |  |  |  |  |  |
| Pentaerythritol tetrastearate | 17.5 | 30.5 | 20.5 | 34.5 |  |  |
| Beeswax |  |  |  |  | 30.5 | 34.5 | may be used to apply the coating formulations disclosed herein. The ratio of solids to solvent in the coating compositions may be varied over a rather broad range to obtain the coating viscosity considered desirable in order to facilitate application of the coating to film materials.

Two one-inch wide strips of the coated film materials were then heat-healed together near one edge with the coated sides in facing relationship at various temperatures using a Sentinel Model 12A heat-sealer. The Sentinel heat-sealer has a movable platen that may be maintained at a high temperature and a stationary platen, the sample being clamped between the two platens for heat-sealing; the stationary platen was covered with "Teflon." Accurate temperature control instruments are associated with the heat-sealer to both record and control the temperature of the heat-sealing platen. In addition, the machine includes timing devices and pressure control devices so that the contact time during which the sample is clamped between the platens and the pressure applied thereto may be varied and controlled. Heat-seal data listed hereinafter were obtained using a one-half second contact or dwell time and from 15–20 p.s.i. jaw pressure. The heat-sealing temperature is the temperature at which the high temperature platen or bar of the heat-sealer was maintained.

After strips of coated film were heat-sealed as described above, the heat-sealed materials were then tested for seal strength on an Amthor Type–272 Tester. This instrument comprises a pair of jaws between which the free ends of the sample are clamped. The lower jaw was then driven downward at the constant speed of 12 inches per minute to cause the sealed area to be "peeled" apart. The force exerted on the sample is indicated by the deflection of a pendulum associated with the tester and the seal strength as set out in the tables hereinafter is taken as the maximum force indicated by the pendulum during the test. The seal strengths reported herein represent the average of from two to four samples at each of the various temperatures. Although heat-seal strengths are reported in grams, it is understood that they represent strengths in grams/inch of heat-seal since samples one inch wide were used to obtain the data.

The coated films were tested for blocking, i.e., unde-

*Table II*

|  | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Film-forming polymeric resin: |  |  |  |  |  |  |  |  |  |  |
| Ethylene-vinyl acetate copolymer | 28.2 | 28.7 | 35.8 | 21.0 |  | 48.0 |  | 32.0 | 39.7 | 28.0 |
| Ethylene-ethyl acrylate copolymer |  |  |  | 27.0 | 33.3 |  | 31.4 |  |  |  |
| Primary anti-block agent: |  |  |  |  |  |  |  |  |  |  |
| Pentaerythritol tetrastearate | 29.3 | 20.1 |  | 24.5 | 27.8 | 24.0 | 28.6 | 16.0 | 27.3 |  |
| Synthetic bayberry wax |  |  |  |  |  | 19.0 |  |  |  |  |
| Beeswax |  |  |  |  |  |  |  | 14.0 |  |  |
| Stearone |  |  | 11.7 |  |  |  |  |  |  | 17.0 |
| Low sealing temperature—Heat-seal strengthening resin: |  |  |  |  |  |  |  |  |  |  |
| Glycerol ester of rosin | 29.3 | 31.8 | 35.8 | 22.0 | 27.8 |  |  |  |  | 28.0 |
| p-toluene sulfonamide-formaldehyde |  |  |  |  |  |  | 28.6 |  | 30.0 |  |
| Glycerol ester of hydrogenated rosin |  |  |  |  |  | 4.5 |  | 27.0 |  |  |
| Surface slip agent: |  |  |  |  |  |  |  |  |  |  |
| Carnauba wax | 3.5 | 4.5 | 5.6 | 2.0 |  | 4.5 |  | 6.0 | 3.0 | 4.5 |
| Chlorinated polypropylene | 6.2 |  | 6.8 | 3.0 |  |  |  | 5.0 |  | 7.0 |
| Bentonite clay |  |  |  | 0.5 |  |  |  |  |  |  |
| Secondary anti-block agent: |  |  |  |  |  |  |  |  |  |  |
| Paraffin wax |  | 14.6 |  |  |  |  |  |  |  |  |
| Micro-crystalline wax |  |  |  |  |  |  |  |  |  | 12.5 |
| Plasticizer: Epoxidized soybean oil | 3.5 |  | 4.3 |  | 11.1 |  | 11.4 |  |  |  |

The coating compositions of the examples were applied to linear polyolefin film materials using standard coating equipment comprising a rotogravure etched cylinder with a doctor blade, the amount of material being applied being controlled in a manner well-known in the art. When necessary, the coating solutions were maintained at an elevated temperature to keep the ingredients in solution. The coated films were then forced dried to permit evaporation of the solvent and the formation of a thin layer of solid heat-seal coating on the film surface. It is contemplated that a variety of application methods sired adhesion between touching layers such as may occur when the film is stored on a roll. When stored for 24 hours at 120° F. films coated with the compositions of this invention showed no tendency to cause blocking between two contacting coated surfaces or between coated surfaces in contact with uncoated surfaces.

Using the foregoing procedures, the coating compositions of the examples were applied to a linear polyethylene film. The coated films were heat-sealed at a number of temperatures using several different film surface relationships: coated surface heat-sealed to coated surface; coated surface heat-sealed to an uncoated, treated surface; and coated surface heat-sealed to an uncoated, untreated surface. Polyolefin films, because of their chemical inertness, are generally treated to increase their receptivity to, for instance, printing ink. Treatment methods for this purpose are well-known and may comprise subjecting the film surface to an electrical corona discharge, an open gas flame or to the action of certain chemical agents. The word "treated" as used hereinafter refers to the fact that the film surface has undergone some form of such treatment. The linear polyethylene film used was "Philjo E301A" film made from "Marlex 5050" resin, which is a copolymer of ethylene with a minor amount of butene-2. The resin from which the film was made had a Vicat softening temperature of 260° F., a density of 0.95 and the film itself had a film softening temperature of 232° F. and was 0.00085″ thick. The heat-seal strengths in grams obtained from the coatings of Examples 1 through 6 are reported in Table III and the heat-seal strengths in grams obtained from the coatings of Examples 7 through 16 are reported in Table IV. It should be noted that the uncoated film could not be heat-sealed at the temperatures listed in Tables III and IV.

Again using the foregoing techniques, the coating compositions of the examples were applied to substantially stereoregular polypropylene and heat-seal strength data obtained throughout a range of temperatures and with various surface relationships. Samples were run on both unoriented and oriented polypropylene. The unoriented polypropylene film was made from an "Avisun" resin with a density of 0.90 and a Vicat softening temperature of 270° F. and the film itself had a film softening temperature of 261° F. and was one mil thick; heat-seal strength data in grams obtained from the coatings of Examples 1 through 6 with this film are reported in Table V and the strengths obtained from the coatings of Examples 7 through 16 are reported in Table VI. The oriented polypropylene film used was a "Kordite" film made from a Hercules "Profax" 83% isotactic resin with a density of 0.90 and a Vicat softening temperature of 317° F. and the film itself had a film softening temperature of 307° F. and was 0.0007″ thick; heat-seal strength data in grams obtained from the coatings of Examples 7 through 16 with this film are recorded in Table VII. As was true with the linear polyethylene film, these two polypropylene films could not be heat-sealed in an uncoated condition at the temperatures reported in Tables V, VI and VII.

*Table III*

| Surface relationship | Heat-seal strength, in grams | | | | | |
|---|---|---|---|---|---|---|
| | Ex. 1 | Ex. 2 | Ex. 3 | Ex. 4 | Ex. 5 | Ex. 6 |
| SEALING TEMP. | | | | | | |
| Coated to coated surface: | | | | | | |
| 170° F | 230 | 330 | 205 | 250 | 180 | 135 |
| 200° F | 320 | 440 | 255 | 335 | 325 | 295 |
| 225° F | 500 | 440 | 335 | 370 | 465 | 390 |
| Coated to uncoated, treated surface: | | | | | | |
| 170° F | 90 | 140 | 50 | 120 | 45 | 70 |
| 200° F | 100 | 210 | 125 | 155 | 155 | 150 |
| 225° F | 325 | 290 | 175 | 195 | 180 | 195 |

*Table V*

| Surface relationship | Heat-seal strength, in grams | | | | | |
|---|---|---|---|---|---|---|
| | Ex. 1 | Ex. 2 | Ex. 3 | Ex. 4 | Ex. 5 | Ex. 6 |
| SEALING TEMP. | | | | | | |
| Coated to coated surface: | | | | | | |
| 170° F | 270 | 300 | 185 | 165 | 85 | 0 |
| 200° F | 330 | 350 | 225 | 280 | 290 | 110 |
| 225° F | 385 | 430 | 355 | 370 | 315 | 280 |
| Coated to uncoated, treated surface: | | | | | | |
| 170° F | 40 | 70 | 20 | 15 | 85 | 0 |
| 200° F | 80 | 105 | 65 | 80 | 60 | 40 |
| 225° F | 135 | 230 | 170 | 165 | 90 | 65 |

*Table IV*

| Surface relationship | Heat-seal strength, in grams | | | | | | | | | |
|---|---|---|---|---|---|---|---|---|---|---|
| | Ex. 7 | Ex. 8 | Ex. 9 | Ex. 10 | Ex. 11 | Ex. 12 | Ex. 13 | Ex. 14 | Ex. 15 | Ex. 16 |
| SEALING TEMP. | | | | | | | | | | |
| Coated to coated surface: | | | | | | | | | | |
| 175° F | 285 | 375 | 330 | 600 | 575 | 130 | 390 | 405 | 250 | 490 |
| 200° F | 220 | 360 | 415 | 575 | 500 | 140 | 345 | 500 | 260 | 500 |
| 225° F | 500 | 445 | 450 | 550 | 560 | 150 | 480 | 590 | 300 | 525 |
| Coated to uncoated, treated surface: | | | | | | | | | | |
| 175° F | 200 | 120 | 400 | 425 | 280 | 130 | 215 | 500 | 200 | 210 |
| 200° F | 220 | 175 | 210 | 450 | 300 | 130 | 250 | 400 | 230 | 250 |
| 225° F | 350 | 360 | 230 | 450 | 320 | 130 | 290 | 400 | 230 | 270 |
| Coated to uncoated, untreated surface: | | | | | | | | | | |
| 175° F | 195 | 110 | 325 | 400 | 240 | 115 | 190 | 410 | 180 | 200 |
| 200° F | 210 | 150 | 190 | 425 | 270 | 120 | 220 | 365 | 200 | 245 |
| 225° F | 345 | 325 | 215 | 430 | 310 | 120 | 265 | 360 | 225 | 260 |

*Table VI*

| Surface relationship | Heat-seal strength, in grams | | | | | | | | | |
|---|---|---|---|---|---|---|---|---|---|---|
| | Ex. 7 | Ex. 8 | Ex. 9 | Ex. 10 | Ex. 11 | Ex. 12 | Ex. 13 | Ex. 14 | Ex. 15 | Ex. 16 |
| SEALING TEMP. | | | | | | | | | | |
| Coated to coated surface: | | | | | | | | | | |
| 175° F | 135 | 575 | 400 | 590 | 550 | 130 | 305 | 340 | 165 | 425 |
| 200° F | 150 | 345 | 585 | 600 | 465 | 140 | 410 | 345 | 200 | 450 |
| 225° F | 180 | 455 | 465 | 590 | 400 | 150 | 325 | 460 | 220 | 460 |
| Coated to uncoated, treated surface: | | | | | | | | | | |
| 175° F | 205 | 125 | 210 | 450 | 275 | 120 | 200 | 130 | 140 | 220 |
| 200° F | 140 | 270 | 170 | 255 | 350 | 140 | 130 | 345 | 160 | 230 |
| 225° F | 175 | 320 | 225 | 265 | 400 | 140 | 170 | 350 | 175 | 240 |
| Coated to uncoated, untreated surface: | | | | | | | | | | |
| 175° F | 195 | 110 | 180 | 425 | 235 | 115 | 170 | 115 | 130 | 200 |
| 200° F | 130 | 255 | 155 | 250 | 340 | 125 | 115 | 340 | 150 | 220 |
| 225° F | 170 | 310 | 215 | 260 | 380 | 130 | 165 | 345 | 170 | 235 |

Table VII

| Surface relationship | Heat-seal strength, in grams | | | | | | | | | |
|---|---|---|---|---|---|---|---|---|---|---|
| | Ex. 7 | Ex. 8 | Ex. 9 | Ex. 10 | Ex. 11 | Ex. 12 | Ex. 13 | Ex. 14 | Ex. 15 | Ex. 16 |
| SEALING TEMP. | | | | | | | | | | |
| Coated to coated surface: | | | | | | | | | | |
| 175° F | 110 | 160 | 290 | 285 | 260 | 120 | 110 | 235 | 140 | 250 |
| 200° F | 115 | 215 | 190 | 290 | 265 | 115 | 150 | 230 | 155 | 250 |
| 225° F | 170 | 140 | 225 | 300 | 240 | 130 | 170 | 250 | 170 | 260 |
| Coated to uncoated, treated surface: | | | | | | | | | | |
| 175° F | 200 | 120 | 400 | 425 | 280 | 130 | 215 | 500 | 200 | 210 |
| 200° F | 130 | 130 | 120 | 225 | 290 | 130 | 125 | 190 | 135 | 170 |
| 225° F | 170 | 140 | 145 | 210 | 310 | 120 | 165 | 210 | 160 | 180 |
| Coated to uncoated, untreated surface: | | | | | | | | | | |
| 175° F | 195 | 110 | 325 | 400 | 240 | 115 | 190 | 410 | 180 | 200 |
| 200° F | 140 | 115 | 110 | 200 | 280 | 115 | 110 | 180 | 130 | 160 |
| 225° F | 160 | 130 | 140 | 210 | 320 | 115 | 150 | 200 | 150 | 175 |

The heat-seal bonds formed by the coatings of this invention exhibit excellent storage characteristics and either improve or retain substantially all of their initial strength upon aging. To demonstrate this, the coatings of Examples 9, 11, 13 and 14 were applied to the linear polyethylene film described above. A number of samples of the coated films were heat-sealed at 225° F. using one-half second dwell and 15 p.s.i. jaw pressure. The heat-seals were tested initially and, for most samples, after storage for one day, seven days and fourteen days. The strength data obtained are recorded in Table VIII. The ability of the coated packaging materials of this invention to provide strong heat-seals after long periods of storage is important to their effectiveness as packaging materials.

The heat-seal coatings of this invention also exhibit excellent aging characteristics in that the coated films produce strong heat-seals even after storage for long periods. To demonstrate this, the heat-seal coatings of Examples 11 and 13 were applied to the linear polyethylene film described above and heat-seals were made from samples of the film shortly after it was coated, one day after it was coated, seven days after it was coated and fourteen days after it was coated. Heat-seals were at 200° F. and 225° F. using one-half second dwell and 15 p.s.i. jaw pressure. The heat-seal strength data obtained are recorded in Table IX. The results indicate the effectiveness of the coated polyolefin packaging materials in providing strong heat-seals even after the coated material is stored for substantial periods of time.

Table IX

| Heat-sealing, temp. | Coating | Film surface relationship | Coating age | | | |
|---|---|---|---|---|---|---|
| | | | Initial | 1 day | 7 days | 14 days |
| 200° F | Ex. 11 | Coated to coated | 400 | 295 | 250 | 215 |
| | | Coated to uncoated, treated | 230 | 150 | 185 | 110 |
| | | Coated to uncoated, untreated | 200 | 135 | 130 | 140 |
| | Ex. 13 | Coated to coated | 235 | 200 | 180 | 175 |
| | | Coated to uncoated, treated | 135 | 200 | 120 | 130 |
| | | Coated to uncoated, untreated | 105 | 200 | 120 | 120 |
| 225° F | Ex. 11 | Coated to coated | 430 | 315 | 450 | 285 |
| | | Coated to uncoated, treated | 240 | 250 | 220 | 230 |
| | | Coated to uncoated, untreated | 200 | 265 | 220 | 270 |
| | Ex. 13 | Coated to coated | 285 | 285 | 195 | 190 |
| | | Coated to uncoated, treated | 185 | 170 | 150 | 140 |
| | | Coated to uncoated, untreated | 170 | 195 | 135 | 140 |

Table VIII

| Coating | Film surface relationship | Initial | Heat-seal age | | |
|---|---|---|---|---|---|
| | | | 1 day | 7 days | 14 days |
| Ex. 9 | Coated to coated | 200 | | 175 | 175 |
| | Coated to uncoated, treated | | | | |
| | Coated to uncoated, untreated | 120 | | 110 | 105 |
| Ex. 11 | Coated to coated | 340 | 310 | 300 | 340 |
| | Coated to uncoated, treated | 200 | 180 | 165 | 175 |
| | Coated to uncoated, untreated | 190 | 240 | 200 | 200 |
| Ex. 13 | Coated to coated | 285 | 250 | 235 | 200 |
| | Coated to uncoated, treated | 185 | 150 | 125 | 85 |
| | Coated to uncoated, untreated | 170 | 145 | 120 | 110 |
| Ex. 14 | Coated to coated | 210 | 190 | 160 | 160 |
| | Coated to uncoated, treated | | | | |
| | Coated to uncoated, untreated | 135 | 120 | 110 | 105 |

The heat-seal data reported hereinabove illustrate the ability of the coated linear polyolefin packaging materials of this invention to be heat-sealed over a broad range of fairly low temperatures. This invention permits linear polyolefin films to be heat-sealed at temperatures at which the uncoated films are non-heat-sealable. The upper limit of the heat-sealing temperature should not exceed 5° F. less than the film softening temperature. The film softening temperature may be determined by use of the so-called Clarkstan melting point meter. In the Vicat softening temperature method a relatively thick sample of the resin to be tested is made, which is normally 1/8" thick, and the softening temperature determined by a needle-penetration technique. Thus the Vicat method is not suitable for thin films which may be on the order of 2 or 3 mils thick. In order to determine the softening temperatures of films produced from resins, a device such as the Clarkstan melting point meter is preferred and is widely used in the film packaging industry. For the purposes of the present invention the term "film softening temperature" will be defined by the hereinafter described technique performed with the use of a Clarkstan melting point meter. This meter is fully illustrated in the 1959 catalogue of Testing Machines Inc., 72 Jericho Turnpike, Mineola, New York, at page 88 thereof. In general, the Clarkstan meter comprises a bar which is heated at one end to give a temperature gradient along the bar, and has a thermocouple mounted on the bar which is adapted to be moved therealong to permit temperature measurements at any desired point on the heated bar. The technique by which the "film softening temperature" is determined with the Clarkstan meter for the purpose of this invention is as follows: A sample strip of film ½" wide and 5" long is placed on the heated bar of the Clarkstan meter for a period of not less than one minute. The "film softening temperature" is determined as that point on the bar at which the viscosity of the film has been lowered so that its tensile strength is essentially zero. At the hot end of the bar, the film melts and adheres firmly thereto, whereas at the cooler end of the bar the film does not so adhere. A position on the bar between the hot end and the cooler end can then be established at which the film is not completely melted so as to adhere to the bar but has lost substantially all of its tensile strength. This point of zero tensile strength is determined by gently pulling on the cool end of the film strip and measuring the temperature at that point on the bar at which the film separates. Thus the "film softening temperature" determined in accordance with this procedure establishes a practical temperature limit for film heat-sealing operations. Film softening temperatures determined by the Clarkstan meter will generally be lower than the Vicat softening temperatures of the resin from which the film is made, as is indicated by the Vicat softening temperature and film softening temperature listed hereinabove in connection with the films used in the foregoing examples. The main reason for this difference is that the normal commercial extrusion or casting processes by which resins of this type are converted into films involve rapid chilling procedures which cause the film density to be somewhat lower than the density of the resin from which it is produced. It should also be noted that the polypropylene materials generally have higher Vicat and film softening temperatures than linear polyethylene materials and it may be possible to seal them at somewhat higher temperatures.

It will be apparent from the foregoing data that the present invention provides coated linear polyolefin films capable of being heat-sealed without departing from the advantages of such films and which coated films may be used as a packaging material on conventional packaging and heat-sealing equipment without requiring modification thereof. The coating compositions of this invention may be applied to the surface of the film substrates in relatively minor amounts when compared with other known heat-seal compositions to thereby provide commercially desired heat-seal strength characteristics. The ability of the coated packaging materials of this invention to form heat-seals of excellent strength between a coated and an uncoated surface as well as between two coated surfaces further extends their utility in the packaging art. Heat-seals formed with the coatings of the present invention provide strong, wrinkle-free seals with no evidence of "burn-through" throughout a broad range of heat-sealing temperatures, which result was heretofore commercially unattainable with linear polyolefin film packaging materials. Thus, this invention provides readily heat-sealable packaging materials of linear polyolefin films which will, for the first time, permit widespread use of linear polyolefin films in the packaging art.

We claim:

1. A heat-sealable packaging material comprising, in combination, a thermoplastic linear polyolefin film substrate formed from a resin having a Vicat softening temperature of at least 235° F. and a heat-sealable coating in adherent relationship thereto, said coating comprising (1) a thermoplastic film-forming polymeric heat-sealing resin consisting essentially of an olefin monomer and an unsaturated monomer containing a polar group, the mols of olefin monomer in said resin being greater than the mols of unsaturated monomer containing a polar group and said resin being compatible with linear polyolefin film, and (2) on a 100% solids basis, at least about 11.7% by weight of an anti-block agent comprising an octane-soluble compound having a long-chain saturated aliphatic hydrocarbon portion and an organic polar group, said anti-block agent being compatible with said film-forming polymeric heat-sealing resin and showing adhesion to the linear polyolefin substrate, said coating being heat-sealable at temperatures at least 5° F. below the film softening temperature of the linear polyolefin film substrate.

2. A packaging material in accordance with claim 1 wherein the octane-soluble compound is selected from the group consisting of organic esters of organic acids having at least one long-chain saturated aliphatic hydrocarbon portion with at least twelve carbon atoms, and organic ketones having at least one long-chain saturated aliphatic hydrocarbon portion with at least twelve carbon atoms.

3. A packaging material in accordance with claim 1 wherein the unsaturated monomer containing a polar group in the thermoplastic film-forming polymeric resin is an ethylenically unsaturated organic ester.

4. A packaging material in accoradnce with claim 1 wherein the thermoplastic film-forming polymeric heat-sealing resin includes an olefin monomer selected from the group consisting of ethylene, propylene, and butene-2 and includes an unsaturated monomer selected from the group consisting of vinyl acetate, allyl acetate, ethyl acrylate and methyl methacrylate.

5. A packaging material in accordance with claim 4 wherein the octane-soluble compound is selected from the group consisting of organic esters of organic acids having at least one long-chain saturated aliphatic hydrocarbon portion with at least twelve carbon atoms, and organic ketones having at least one long-chain saturated aliphatic hydrocarbon portion with at least twelve carbon atoms.

6. A packaging material in accordance with claim 5 wherein the linear polyolefin film substrate is formed from a resin including an olefin selected from the group consisting of ethylene and propylene.

7. A heat-sealable packaging material comprising, in combination, a thermoplastic linear polyolefin film substrate formed from a resin having a Vicat softening temperature of at least 235° F. and a heat-sealable coating in adherent relationship thereto, said coating comprising (1) a thermoplastic film-forming polymeric heat-sealing resin consisting essentially of an olefin monomer and an unsaturated monomer containing a polar group, the mols of olefin monomer in said resin being greater than the mols of unsaturated monomer containing a polar group and said resin being compatible with linear polyolefin film, and (2) on a 100% solids basis, at least about 11.7% by weight of an anti-block agent comprising an octane-soluble compound including at least two long-chain saturated aliphatic hydrocarbon portions and at least one organic polar group, said anti-block agent being compatible with said film-forming polymeric heat-sealing resin and showing adhesion to the linear polyolefin substrate, said coating being heat-sealable at temperatures at least 5° F. below the film softening temperature of the linear polyolefin film substrate.

8. A packaging material in accordance with claim 7 wherein the octane-soluble compound has at least two long-chain saturated aliphatic hydrocarbon radicals with at least twelve carbon atoms each and at least one carbonyl group.

9. A packaging material in accordance with claim 7 wherein the unsaturated monomer containing a polar group in the thermoplastic film-forming polymeric resin is an ethylenically unsaturated organic ester.

10. A packaging material in accordance with claim 7 wherein the thermoplastic film-forming polymeric heat-sealing resin includes an olefin monomer selected from the group consisting of ethylene, propylene and butene-2 and includes an unsaturated monomer selected from the group consisting of vinyl acetate, allyl acetate, ethyl acrylate and methyl methacrylate.

11. A packaging material in accordance with claim 10 wherein the anti-block agent comprising an octane-soluble compound is selected from the group consisting of pentaerythritol tetrastearate, synthetic bayberry wax, natural bayberry wax, stearone, beeswax, and mixtures thereof.

12. A packaging material in accordance with claim 11 wherein the linear polyolefin film substrate is formed from a resin including an olefin selected from the group consisting of ethylene and propylene.

13. A heat-sealable packaging material comprising, in combination, a thermoplastic linear polyolefin film substrate formed from a resin having a Vicat softening temperature of at least 235° F. and a heat-healable coating in adherent relationship thereto, said coating comprising (1) a thermoplastic film-forming polymeric heat-sealing resin consisting essentially of an olefin monomer and an unsaturated monomer containing a polar group, the mols of olefin monomer in said resin being greater than the mols of unsaturated monomer containing a polar group and said resin being compatible with linear polyolefin film, (2) on a 100% solids basis, at least about 11.7% by weight of an anti-block agent comprising an octane-soluble compound having a long-chain saturated aliphatic hydrocarbon portion and an organic polar group, said anti-block agent being compatible with said film-forming polymeric heat-sealing resin and showing adhesion to the linear polyolefin substrate, and (3) a low sealing temperature heat-seal strengthening resin that is compatible with said heat-sealing resin and that has a melting point of 100° C. or less; said coating being heat-sealable at temperatures at least 5° F. below the film softening temperature of the linear polyolefin film substrate.

14. A packaging material in accordance with claim 13 wherein the octane-soluble compound is selected from the group consisting of organic esters of organic acids having at least one long-chain saturated aliphatic hydrocarbon portion of at least twelve carbon atoms, and organic ketones having at least one long-chain saturated aliphatic hydrocarbon portion of at least twelve carbon atoms.

15. A packaging material in accordance with claim 13 wherein the unsaturated monomer containing a polar group in the thermoplastic film-forming polymeric resin is an ethylenically unsaturated organic ester.

16. A packaging material in accordance with claim 13 wherein (1) the thermoplastic film-forming polymeric heat-sealing resin includes an olefin monomer selected from the group consisting of ethylene, propylene and butene-2 and includes an unsaturated monomer selected from the group consisting of vinyl acetate, allyl acetate, ethyl acrylate and methyl methacrylate; (2) the anti-block agent comprising an octane-soluble compound is selected from the group consisting of pentaerythritol tetrastearate, synthetic bayberry wax, natural bayberry wax, stearone, beeswax, and mixtures thereof; and (3) the low sealing temperature heat-seal strengthening resin is selected from the group consisting of glycerol esters of rosin, glycerol esters of hydrogenated rosin, glycerol esters of polymerized rosin, p-toluene sulfonamide-formaldehyde resins, phenol-formaldehyde resins, phenol modified coumarone-indene resins, alkylated phenolic resins, chlorinated biphenyl resins, terpene type hydrocarbon resins, and mixtures thereof.

17. A packaging material in accordance with claim 16 wherein the linear polyolefin film substrate is formed from a resin including an olefin selected from the group consisting of ethylene and propylene.

18. A heat-seal coating composition comprising, in combination, (1) a thermoplastic film-forming polymeric heat-sealing resin consisting essentially of an olefin monomer and an unsaturated monomer containing a polar group, the mols of olefin monomer in said resin being greater than the mols of unsaturated monomer containing a polar group, and (2) on a 100% solids basis, at least about 11.7% of an anti-block agent comprising an octane-soluble compound including at least two long-chain saturated aliphatic hydrocarbon portions and at least one organic polar group, said anti-block agent being compatible with said film-forming polymeric heat-sealing resin and showing adhesion to a linear polyolefin substrate.

19. A heat-seal coating composition in accordance with claim 18 wherein (1) the thermoplastic film-forming polymeric heat-sealing resin includes an olefin monomer selected from the group consisting of ethylene, propylene and butene-2 and includes an unsaturated monomer selected from the group consisting of vinyl acetate, allyl acetate, ethyl acrylate and methyl methacrylate; and (2) the anti-block agent comprising an octane-soluble compound is selected from the group consisting of pentaerythritol tetrastearate, synthetic bayberry wax, natural bayberry wax, stearone, beeswax, and mixtures thereof.

20. A heat-seal coating composition in accordance with claim 19 further including a low sealing temperature heat-seal strengthening resin selected from the group consisting of glycerol esters of rosin, glycerol esters of hydrogenated rosin, glycerol esters of polymerized rosin, p-toluene sulfonamide-formaldehyde resins, phenol-formaldehyde resins, phenol modified coumarone-indene resins, alkylated phenolic resins, chlorinated biphenyl resins, terpene type hydrocarbon resins, and mixtures thereof.

21. A method for imparting heat-sealability to thermoplastic linear polyolefin film formed from a resin having a Vicat softening temperature of at least 235° F., comprising the steps of (1) applying a coating to at least one surface of the film, said coating comprising (a) a thermoplastic film-forming polymeric heat-sealing resin consisting essentially of an olefin monomer and an unsaturated monomer containing a polar group, the mols of olefin monomer in said resin being greater than the mols of unsaturated monomer containing a polar group and said resin being compatible with linear polyolefin film, and (b) on a 100% solids basis, at least about 11.7% of an anti-block agent comprising an octane-soluble compound having a long-chain saturated aliphatic hydrocarbon portion and an organic polar group, said anti-block agent being compatible with said film-forming polymeric heat-sealing resin and showing adhesion to the linear polyolefin substrate, said coating being heat-sealable at temperatures at least 5° F. below the film softening temperature of the linear polyolefin film; and (2) drying said coating.

22. The method of claim 21 wherein the coating is applied in an amount equivalent to from about 0.5 to about 1.5 pounds, on a 100% solids basis, of coating per 3,000 square feet of film surface.

23. A method for imparting heat-sealability to thermoplastic linear polyolefin film formed from a resin having a Vicat softening temperature of at least 235° F., comprising the steps of (1) applying a coating to at least one surface of the film, said coating comprising (a) a thermoplastic film-forming polymeric heat-sealing resin consisting essentially of an olefin monomer and an unsaturated monomer containing a polar group, the mols of olefin monomer in said resin being greater than the mols of unsaturated monomer containing a polar group and said resin being compatible with linear polyolefin film, (b) on a 100% solids basis, at least about 11.7% of an anti-block agent comprising an octane-soluble compound having a long-chain saturated aliphatic hydrocarbon portion and an organic polar group, said anti-block agent being compatible with said film-forming polymeric heat-sealing resin and showing adhesion to the linear polyolefin substrate, and (c) a low sealing temperature heat-seal strengthening resin that is compatible with said heat-sealing resin and that has a melting point of 100° C. or less, said coating being heat-sealable at temperatures at least 5° F. below the film softening temperature of the linear polyolefin film substrate; and (2) drying said coating.

24. The method of claim 23 wherein the coating is applied in an amount equivalent to from about 0.5 to about 1.5 pounds, on a 100% solids basis, of coating per 3,000 square feet of film surface.

References Cited by the Examiner
UNITED STATES PATENTS

| | | | |
|---|---|---|---|
| 2,490,536 | 12/1949 | Murphy et al. | 117—138.8 |
| 2,824,019 | 2/1959 | Sapper | 117—138.8 |
| 3,025,167 | 3/1962 | Butler | 117—158 |
| 3,048,553 | 8/1962 | Moss | 260—28.5 |
| 3,088,844 | 5/1963 | Hungerford et al. | 117—138.8 |

RICHARD D. NEVIUS, *Primary Examiner.*

UNITED STATES PATENT OFFICE
CERTIFICATE OF CORRECTION

Patent No. 3,232,789                              February 1, 1966

Victor J. Pelzek et al.

It is hereby certified that error appears in the above numbered patent requiring correction and that the said Letters Patent should read as corrected below.

Column 6, line 12, for "4:1" read -- 40:1 --; column 8, line 41, for "Solvents" read -- Solvent --; line 75, for "coating" read -- coatings --; column 10, line 7, for "heat-healed" read -- heat-sealed --; column 17, line 20, for "heat-healable" read -- heat-sealable --.

Signed and sealed this 17th day of January 1967.

(SEAL)
Attest:

ERNEST W. SWIDER
Attesting Officer

EDWARD J. BRENNER
Commissioner of Patents